US008239412B2

(12) United States Patent
Asikainen et al.

(10) Patent No.: US 8,239,412 B2
(45) Date of Patent: Aug. 7, 2012

(54) RECOMMENDING A MEDIA ITEM BY USING AUDIO CONTENT FROM A SEED MEDIA ITEM

(75) Inventors: Joonas Asikainen, Zurich (CH); Brian Kenneth Vogel, Weidman, MI (US)

(73) Assignee: Rovi Technologies Corporation, Santa Clara, CA (US)

( * ) Notice: Subject to any disclaimer, the term of this patent is extended or adjusted under 35 U.S.C. 154(b) by 163 days.

(21) Appl. No.: 12/774,592

(22) Filed: May 5, 2010

(65) Prior Publication Data

US 2011/0276567 A1 Nov. 10, 2011

(51) Int. Cl.
*G06F 17/00* (2006.01)
(52) U.S. Cl. ......... 707/791; 707/802; 707/822; 707/828
(58) Field of Classification Search ........... 707/600–861
See application file for complete search history.

(56) References Cited

U.S. PATENT DOCUMENTS

| | | | |
|---|---|---|---|
| 6,230,192 B1 | 5/2001 | Roberts et al. | |
| 6,330,593 B1 | 12/2001 | Roberts et al. | |
| 6,604,072 B2 | 8/2003 | Pitman et al. | |
| 6,748,360 B2 | 6/2004 | Pitman et al. | |
| 6,993,532 B1 | 1/2006 | Platt et al. | 707/102 |
| 7,277,766 B1 | 10/2007 | Kahn et al. | |
| 7,451,078 B2 | 11/2008 | Bogdanov | |
| 2005/0038819 A1 | 2/2005 | Hicken et al. | 707/104.1 |
| 2007/0106405 A1 | 5/2007 | Cook et al. | 700/94 |
| 2007/0288478 A1 | 12/2007 | DiMaria et al. | |
| 2009/0164516 A1* | 6/2009 | Svendsen et al. | 707/104.1 |
| 2010/0318586 A1 | 12/2010 | Wessling | |
| 2011/0173185 A1 | 7/2011 | Vogel | |
| 2011/0173208 A1 | 7/2011 | Vogel | |

* cited by examiner

*Primary Examiner* — Isaac M Woo
(74) *Attorney, Agent, or Firm* — Fitzpatrick, Cella, Harper & Scinto (57) ABSTRACT

A method and a system are provided for recommending a media item (e.g., movie and/or television program). In one example, the system receives a seed media item (e.g., seed movie and/or seed television program). A seed media item is an audio-visual recording that is identified as being of interest to a user. The system recognizes one or more recognized audio tracks (e.g., audio tracks and/or songs) from the seed media item. A recognized audio track is an audio recording that is contained in the seed media item. The system retrieves audio track metadata associated with at least one of the recognized audio tracks from the seed media item. Audio track metadata are data that describes an audio recording. The system recommends one or more recommended media items based on the audio track metadata. A recommended media item is an audio-visual recording (e.g., movie and/or television program).

28 Claims, 6 Drawing Sheets

RECOMMENDING A MEDIA ITEM BY USING AUDIO CONTENT FROM A SEED MEDIA ITEM

FIELD OF THE INVENTION

The present invention relates to recommending media items (e.g., movies and/or television programs). More particularly, the present invention relates to recommending media items by using audio content (e.g., audio tracks and/or songs) from a seed media item.

BACKGROUND

Recommender systems form a specific type of information filtering technique that attempts to present media items (e.g., movies and/or television programs, etc.) that are likely of interest to a user. A recommender system typically compares a user's profile to some reference characteristics, and seeks to predict the "rating" that a user would give to a media item the user had not yet considered.

A recommender system typically uses a content-based approach or a collaborative filtering approach. In a content-based approach, the recommender system compares the user's profile to content from the media item of interest. In a collaborative filtering approach, the recommender system compares the user's profile to profiles of other users. For example, a recommender system may collect data by using collaborative filtering systems to determine a user's tastes and interests as the user searches the Internet. Sites may gather information about the user's personal interests, compare the user's information to other information from users with similar interests and make recommendations (e.g., movies the user will likely enjoy, a book the user should read, etc.).

SUMMARY

A recommender system may have no access, or limited access, to user profile information. Accordingly, it is often useful for a recommender system to analyze primarily the content of a media item (e.g., movie and/or television program, etc.) in order to recommend other media items.

In a first embodiment, a method and a system are provided for recommending a media item by using metadata. Operations of the method and the system comprise the following: receiving a seed media item, wherein a seed media item is an audio-visual recording that is identified as being of interest to a user; recognizing one or more recognized audio tracks from the seed media item, wherein a recognized audio track is an audio recording that is contained in the seed media item; retrieving audio track metadata associated with at least one of the recognized audio tracks from the seed media item, wherein audio track metadata are data that describes an audio recording; and recommending one or more recommended media items based on the audio track metadata, wherein a recommended media item is an audio-visual recording.

In a second embodiment, a computer readable medium comprises one or more instructions for recommending a media item by using metadata. The one or more instructions are configured for causing one or more processors to perform the following steps: receiving a seed media item, wherein a seed media item is an audio-visual recording that is identified as being of interest to a user; recognizing one or more recognized audio tracks from the seed media item, wherein a recognized audio track is an audio recording that is contained in the seed media item; retrieving audio track metadata associated with at least one of the recognized audio tracks from the seed media item, wherein audio track metadata are data that describes an audio recording; and recommending one or more recommended media items based on the audio track metadata, wherein a recommended media item is an audio-visual recording.

In a third embodiment, a method and a system are provided for recommending a media item by using recommended audio tracks. Operations of the method and the system comprise the following: receiving a seed media item, wherein a seed media item is an audio-visual recording that is identified as being of interest to a user; recognizing one or more recognized audio tracks from the seed media item, wherein a recognized audio track is an audio recording that is contained in the seed media item; retrieving audio track metadata associated with at least one of the recognized audio tracks from the seed media item, wherein audio track metadata are data that describes an audio recording; recommending one or more recommended audio tracks based on the audio track metadata, wherein the recommending is based on the audio track metadata associated with at least one of the recognized audio tracks from the seed media item; identifying one or more identified media items; and recommending one or more recommended media items.

In a fourth embodiment, a computer readable medium comprises one or more instructions for recommending a media item by using recommended audio tracks. The one or more instructions are configured for causing one or more processors to perform the following steps: receiving a seed media item, wherein a seed media item is an audio-visual recording that is identified as being of interest to a user; recognizing one or more recognized audio tracks from the seed media item, wherein a recognized audio track is an audio recording that is contained in the seed media item; retrieving audio track metadata associated with at least one of the recognized audio tracks from the seed media item, wherein audio track metadata are data that describes an audio recording; recommending one or more recommended audio tracks based on the audio track metadata, wherein the recommending is based on the audio track metadata associated with at least one of the recognized audio tracks from the seed media item; identifying one or more identified media items; and recommending one or more recommended media items.

The invention encompasses other embodiments configured as set forth above and with other features and alternatives. It should be appreciated that these embodiments may be implemented in numerous ways, including as a method, a process, an apparatus, a system and/or a device.

BRIEF DESCRIPTION OF THE DRAWINGS

The inventive embodiments will be readily understood by the following detailed description in conjunction with the accompanying drawings. To facilitate this description, like reference numerals designate like structural elements.

DETAILED DESCRIPTION

An invention is disclosed for a method and a system for recommending media items by using audio content (e.g., audio tracks and/or songs) from a seed media item (e.g, movie and/or television program). Numerous specific details are set forth in order to provide a thorough understanding of various embodiments. It will be understood, however, to one skilled in the art, that the embodiments may be practiced with other specific details.

DEFINITIONS

Some terms are defined below in alphabetical order for easy reference. These terms are not rigidly restricted to these definitions. A term may be further defined by its use in other sections of this description.

"Audio track" means an audio recording. An audio track is preferably a song and/or a song portion. An audio track may be on a disc, such as, for example, a Blu-ray Disc, a CD and/or a DVD.

"Chapter" means audio and/or visual data block for playback. A chapter preferably includes without limitation computer readable data generated from a waveform of an audio and/or visual signal (e.g., audio/visual data). Examples of a chapter include without limitation a video track, an audio track, a book chapter, magazine chapter, a publication chapter, a CD chapter, a DVD chapter and/or a Blu-ray Disc chapter.

"Database" means a collection of data organized in such a way that a computer program may quickly select desired pieces of the data. A database is an electronic filing system. In some implementations, the term "database" may be used as shorthand for "database management system" and/or "database system".

"Device" means software, hardware or a combination thereof. A device may sometimes be referred to as an apparatus. Examples of a device include without limitation a software application such as Microsoft Word™, a laptop computer, a database, a server, a display, a computer mouse, and a hard disk.

"Fingerprint" (e.g., "audio fingerprint", "acoustic fingerprint", and/or "digital fingerprint") is a digital measure of certain properties of a waveform of an audio and/or visual signal (e.g., audio/visual data). An audio fingerprint is typically a fuzzy representation of an audio waveform generated by applying preferably a Fast Fourier Transform (FFT) to the frequency spectrum contained within the audio waveform. An audio fingerprint may be used to identify an audio sample and/or quickly locate similar items in an audio database. An audio fingerprint typically operates as an identifier for a particular item, such as, for example, an audio track, a song, a recoding, an audio book, a CD, a DVD and/or a Blu-ray Disc. An audio fingerprint is an independent piece of data that is not affected by metadata. The company Rovi™ Corporation has databases that store over 100 million unique fingerprints for various audio samples. Practical uses of audio fingerprints include without limitation identifying songs, identifying recordings, identifying melodies, identifying tunes, identifying advertisements, monitoring radio broadcasts, monitoring peer-to-peer networks, managing sound effects libraries and/or identifying video files.

"Fingerprinting" is the process of generating a fingerprint for an audio and/or visual waveform. U.S. Pat. No. 7,277,766 (the '766 patent), entitled "Method and System for Analyzing Digital Audio Files", which is herein incorporated by reference, provides an example of an apparatus for audio fingerprinting an audio waveform. U.S. Pat. No. 7,451,078 (the '078 patent), entitled "Methods and Apparatus for Identifying Media Objects", which is herein incorporated by reference, provides an example of an apparatus for generating an audio fingerprint of an audio chapter. U.S. patent application Ser. No. 12/456,177 (the '177 patent application), by Jens Nicholas Wessling, entitled "Managing Metadata for Occurrences of a Chapter", which is herein incorporated by reference, provides an example of identifying metadata by storing an internal identifier (e.g., fingerprint) in the metadata.

"Media item" means an audio and/or visual recording (e.g., audio-visual recording). A media item is preferably a movie and/or a television program.

"Metadata" (e.g., "audio track metadata," "song metadata", "music metadata", "media metadata", "movie metadata", and/or "television program metadata") generally means data that describes data. More particularly, metadata means data that describes the contents of an audio and/or visual recording. For example, metadata may include without limitation genre, theme, instruments, mood, era, movie title, actors names and/or director name.

"Network" means a connection, which permits the transmission of data, between any two or more computers. A network may be any combination of networks, including without limitation the Internet, a local area network, a wide area network, a home network, a wireless network and/or a cellular network.

"Seed media item" means a media item that is identified as being of interest to a user, for example, by way of a user device indicating the media item is of interest. For instance, a user may browse a webpage and may click on a link to a movie in order to get more information about the movie. The system receives the click information from the user device. The system may then identify the movie associated with the clicked link as being a seed media item.

"Server" means a software application that provides services to other computer programs (and their users), in the same or other computer. A server may also refer to the physical computer that has been set aside to run a specific server application. For example, when the software Apache HTTP Server is used as the web server for a company's website, the computer running Apache is also called the web server. Server applications can be divided among server computers over an extreme range, depending upon the workload.

"Software" means a computer program that is written in a programming language that may be used by one of ordinary skill in the art. The programming language chosen should be compatible with the computer by which the software application is to be executed and, in particular, with the operating system of that computer. Examples of suitable programming languages include without limitation Object Pascal, C, C++ and Java. Further, the functions of some embodiments, when described as a series of steps for a method, could be implemented as a series of software instructions for being operated by a processor, such that the embodiments could be implemented as software, hardware or a combination thereof. Computer readable media are discussed in more detail in a separate section below.

"Song" means a musical composition. A song is typically recorded onto a track by a recording label (e.g., recording company). A song may have many different versions, for example, a radio version and an extended version.

"System" means a device and/or multiple coupled devices. A device is defined above.

"User" means an operator of a computer. A user may include without limitation a consumer, an administrator, a client, and/or a client device in a marketplace of products and/or services.

"User device" (e.g., "client", "client device", and/or "user computer") is a hardware system, a software operating system and/or one or more software application programs. A user device may refer to a single computer and/or to a network of interacting computers. A user device may be the client part of a client-server architecture. A user device typically relies on a server to perform some operations. Examples of a user device include without limitation a laptop computer, a CD player, a DVD player, a Blu-ray Disc player, a smart phone, a cell phone, a personal media device, a portable media player, an iPod™, a Zune™ Player, a palmtop computer, a mobile phone, an mp3 player, a digital audio recorder, a digital video recorder, an IBM-type personal computer (PC) having an operating system such as Microsoft Windows™, an Apple™ computer having an operating system such as MAC-OS, hardware having a JAVA-OS operating system, and/or a Sun Microsystems Workstation having a UNIX operating system.

"Web browser" means any software program which can display text, graphics, or both, from Web pages on Web sites. Examples of a Web browser include without limitation Mozilla Firefox™ and Microsoft Internet Explorer™.

"Web page" means any documents written in mark-up language including without limitation HTML (hypertext mark-up language), VRML (virtual reality modeling language), dynamic HTML, XML (extended mark-up language) and/or related computer languages thereof, as well as to any collection of such documents reachable through one specific Internet address or at one specific Web site, or any document obtainable through a particular URL (Uniform Resource Locator).

"Web server" refers to a computer and/or another electronic device that is capable of serving at least one Web page to a Web browser. An example of a Web server is a Yahoo™ Web server.

"Web site" means at least one Web page, and more commonly a plurality of Web pages, virtually coupled to form a coherent group.

I. Architecture Overview

Figure 1:
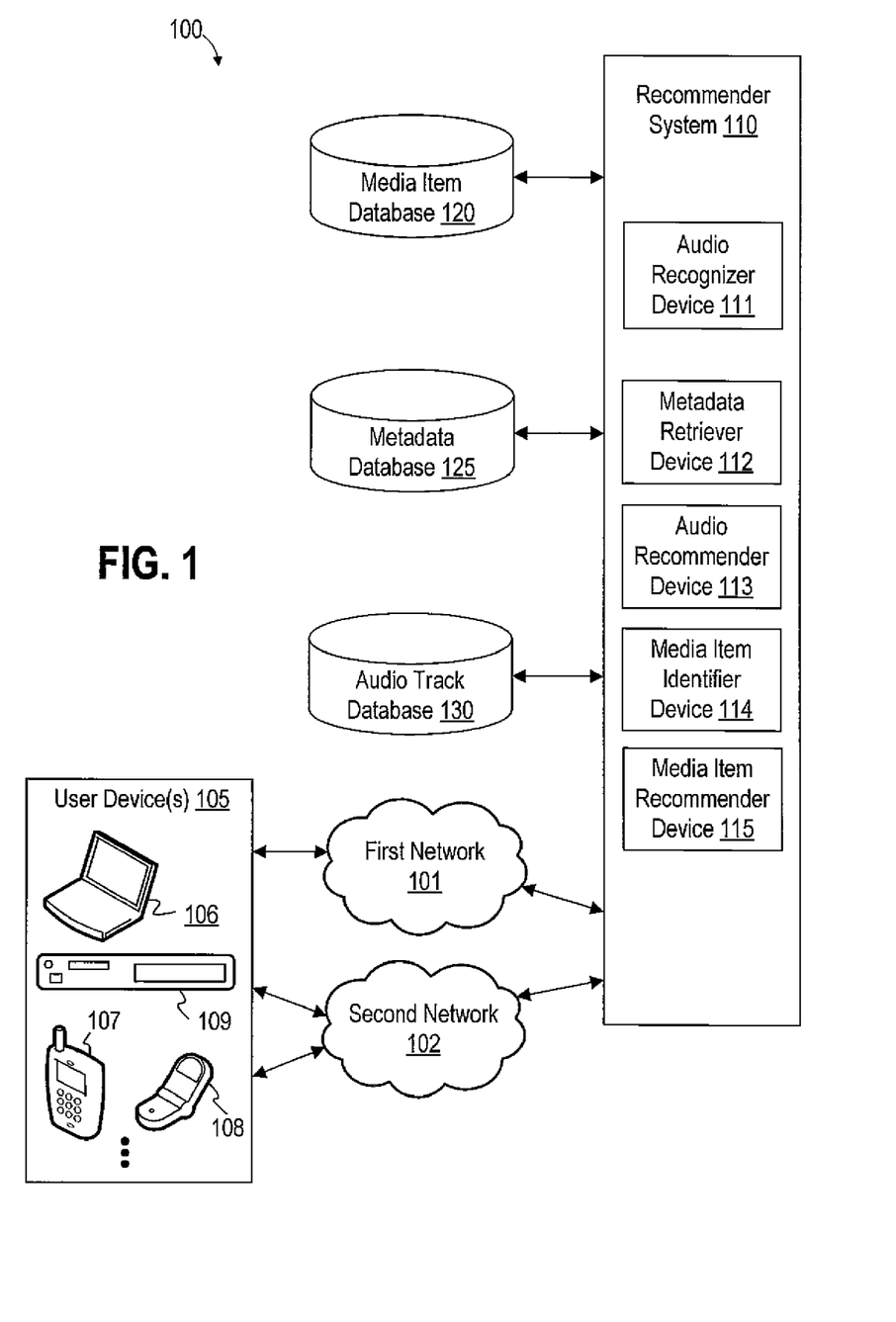
FIG. 1 is a block diagram of a system for recommending a media item by using audio content from a media item, in accordance with some embodiments.

FIG. 1 is a block diagram of a system 100 for recommending a media item by using audio content from a media item, in accordance with some embodiments. A media item may include, for example, a movie and/or a television program, among other things. Audio content from a media item may include one or more audio tracks. An audio track from a media item preferably refers to a song (e.g., "Jingle Bells", "Star Spangled Banner", and/or "Ribbon in the Sky", etc.) and/or a portion of a song.

The system 100 includes without limitation a recommender system 110, a first network 101, a second network 102, one or more user devices 105, a media item database 120, a metadata database 125 and/or an audio track database 130.

The recommender system 110 preferably resides on an application server and/or a database server.

The media item database 120 may include without limitation movie content and/or television program content. The metadata database 125 may include without limitation at least one audio track identifier (e.g., fingerprints, etc.) that is associated with metadata that are associated with audio tracks. The audio track database 130 may include without limitation at least one audio track identifier that is associated with a media item that contains the audio track.

The recommender system 110 may be coupled to (or includes) the media item data base 120, the metadata database 125 and/or the audio track database 130. Each database shown may store, among other things, data collected and/or generated from one or more exemplary user devices 105. Examples of a user device 105 include without limitation a laptop 106, a disc player 109, a smart phone 107 and/or a cell phone 108, among other user devices. As shown in FIG. 1, the user devices are coupled to the same network or, alternatively, to different networks. For instance, the user device 106 may be coupled to the first network 101, while the user devices 107, 108 and 109 may be coupled to the second network 102. The networks 101 and 102 may include a variety of network types, such as, for example, local area networks, wide area networks, networks of networks, the Internet, as well as home media type networks.

The recommender system 110 preferably includes one or more of the following: an audio recognizer device 111, a metadata retriever device 112, an audio recommender device 113, a media item identifier device 114 and/or a media item recommender device 115. Each of these devices has functionality that is described below with reference to the appropriate figures.

It will be readily appreciated that the schematic of FIG. 1 is for explanatory purposes, and that numerous variations are possible. For example, the system 100 may include a database (or system of databases) arranged in a configuration that is different than the databases depicted here. Other configurations exist as well.

II. Recommending a Media Item by Using Metadata

A system is provided for recommending one or more media items (e.g., movies and/or television programs, etc.) based on metadata associated audio tracks (e.g., songs) from a seed media item. A seed media item is a media item that the system has identified as being of interest to a user. The system automatically generates metadata as a result of analyzing audio tracks from the seed media item. The system may then generate recommended media items based on the metadata generated from the analysis of audio tracks from the seed media item.

Figure 2:
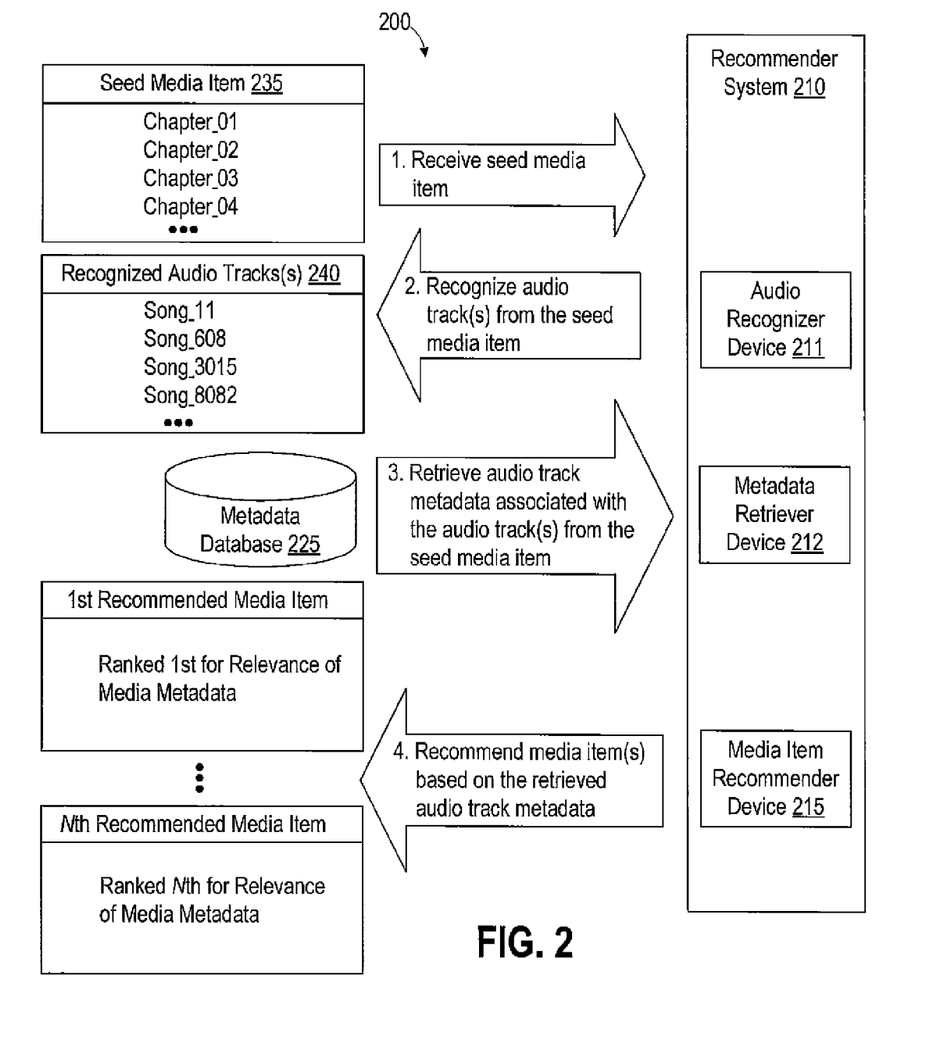
FIG. 2 is a schematic diagram of a system for generating media item recommendations by using metadata associated with audio tracks from a seed media item, in accordance with some embodiments.

FIG. 2 is a schematic diagram of a system 200 for generating media item recommendations by using metadata associated with audio tracks from a seed media item 235, in accordance with some embodiments. The system 200 is configured for receiving the seed media item 235. A seed media item is a media item that the system has identified as being of interest to a user. "Being of interest to a user" means, among other things, a user likes, notices and/or selects the media item. The user may show interest, for example, by way of a user device indicating the media item has been selected by the user. For example, a user may browse a webpage and may click on a link to a movie in order to get more information about the movie. The system 200 receives the click signal from the user device. The system 200 may then identify the movie associated with the clicked link as being a seed media item 235. Other ways are also feasible for the system 200 to identify a media item as being a seed media item.

The system 200 may retrieve the audio and/or visual contents of the seed media item 235 from a database, such as, for example, the media item database 120 of FIG. 1. The audio and/or visual content in the seed media item 235 is segmented into chapters. A chapter is an audio and/or visual data block for playback. For example, the seed media item 235 contains Chapter_01, Chapter_02, Chapter_03, Chapter_04 and so on.

The audio recognizer device 211 is configured for recognizing one or more audio tracks from the seed media item. An audio track is preferably a recognizable song (e.g., "Jingle Bells", "Star Spangled Banner", "Ribbon in the Sky", etc.). The audio recognizer device 211 may use a recognition technique to recognize one or more audio tracks from the media item. U.S. Pat. Nos. 6,604,072 and 6,748,360 (the '072 and '360 patent), which are herein incorporated by reference, provide a rolling recognition technique for recognizing one or more audio tracks from a media item. A rolling recognition technique involves receiving a media item (e.g., movie and/or television program, etc.) and automatically identifying the songs from the audio content of the media item.

In the example of FIG. 2, the recognized audio tracks 240 are Song_11, Song_608, Song_3025, Song_8082 and so on. The recognition technique may also involve storing audio track identifiers (e.g., fingerprints, etc.) into a database for use in identifying songs. For example, the system 200 may store fingerprints into a metadata database 225 for use in identifying songs and storing metadata related to the songs. U.S. Pat. Nos. 6,230,192 and 6,330,593 (the '192 and '593 patents), which are herein incorporated by reference, provide examples of systems for using fingerprints as audio track identifiers. Each audio track identifier is associated with metadata that is associated with an audio track. U.S. Patent Publication No. 2007-0288478 (the '478 patent publication), entitled "Method and System for Media Navigation", which is herein incorporated by reference, provides an example of a method for navigating and searching through media on a database with the use of identifiers.

The metadata database 225 is configured for storing, among other things, metadata associated with one or more media items. The system 200 may originally obtain such metadata from various metadata sources, including, for example, user devices, administrator devices and/or robotic devices, among other sources. An example of a user device is a laptop computer for a user on a network, such as, for example, the Internet. An example of an administrator device is an administrator computer for an administrator of the system 200. An example of a robotic device is a robot that scans the Internet for metadata.

More particularly, the metadata database 225 preferably stores metadata associated with the recognized audio tracks 240. Such metadata preferably includes prominent metadata elements. For example, prominent metadata elements may include genre, theme, instruments, mood and/or era, etc. Genre may include, for example, rock, hip-hop, jazz, disco and/or classical, etc. Theme may include, for example, driving music, workout music, sleeping music, and/or another activity to which the song fits. Instruments may include, for example, Brazilian percussion, acoustic strings quartet and/or brass instruments, etc. Mood may include, for example, mellow, high intensity, easy listening, dark, light, and/or organic, etc. Era may include, for example, 1950's, 1970's, and/or 1990's, etc.

The metadata database 225 is preferably organized according to audio track identifiers (e.g., fingerprints, etc.). For example, the metadata database 225 may store a list of fingerprints that are each linked to metadata for an audio track. Each identifier in the metadata database 225 may also be linked to audio content for the audio track. Another database, such as the media item database 120 of FIG. 1, preferably stores the audio content for the audio track.

The metadata retriever device 212 is configured for retrieving audio track metadata associated with the recognized audio track(s) 240 from the seed media item 235. For example, the metadata retriever device 212 may retrieve audio track metadata from the metadata database 225. In an alternative embodiment, such audio track metadata may be directly associated with the seed media item 235 as being media metadata for the seed media item 235. For example, a seed media item 235 (e.g., a seed movie) may have songs that are associated with audio track metadata related to themes and/or genres such as of war, friendship, rock music, among other things. The system 200 may be configured for treating this audio track metadata as, more directly, being media metadata for the seed media item 235. Accordingly, this media metadata may be associated directly with the content of the seed media item 235.

The media item recommender device 215 is configured for recommending one or more media items (e.g., movie and/or television program, etc.). Note that each recommended media item is preferably associated with media metadata (e.g., movie metadata). The media metadata may come from various sources, such as, for example, a director's input, a newspaper editor, an Internet blogger and/or a movie reviewer, among other sources. A database, such as the metadata database 225, may store the media metadata. The media item recommender device 215 is configured for comparing the media metadata (e.g., movie metadata) to the audio track metadata, which is retrieved by the metadata retriever device 212 as described above.

The strength of each media item recommendation is based on the media metadata relevance to the retrieved audio track metadata for the recognized audio tracks 240. Alternatively, the strength of each media item recommendation is based on the media metadata relevance to the metadata associated directly with the seed media item 235. The media item recommender device 215 preferably ranks the recommended media items according to levels of media metadata relevance to the retrieved audio track metadata and/or the seed media item metadata. The ranking preferably spans from 1st to Nth, where N is a positive integer. For example, the 1st recommended media item is preferably ranked 1st for being associated with media metadata having relatively higher relevance to the retrieved audio track metadata and/or the seed media item metadata. The Nth recommended media item is preferably ranked Nth for being associated with media metadata having relatively lower relevance to the retrieved audio track metadata and/or the seed media item metadata.

The system 200 is configured for sending to a user device the one or more recommended media items. The user device is configured for displaying the one or more recommended media items, or is configured for displaying information that identifies the one or more recommended media items.

To further clarify an alternative embodiment, the system 200 may be configured for using the metadata in the metadata database 225 to generate media metadata content for the seed media item 235. As described above, the metadata database 225 includes audio track metadata associated with the recognized audio tracks 240. The system 200 may then directly associate the seed media item 235 with these audio track metadata associated with the recognized audio tracks 240. Metadata that are directly associated with the seed media item 235 may be referred to as seed media item metadata. The system 200 may later use these seed media item metadata that are directly associated with the seed media item 235 for performing content-based media item recommendations.

Overview of a Method for Recommending a Media Item by Using Metadata

Figure 3:
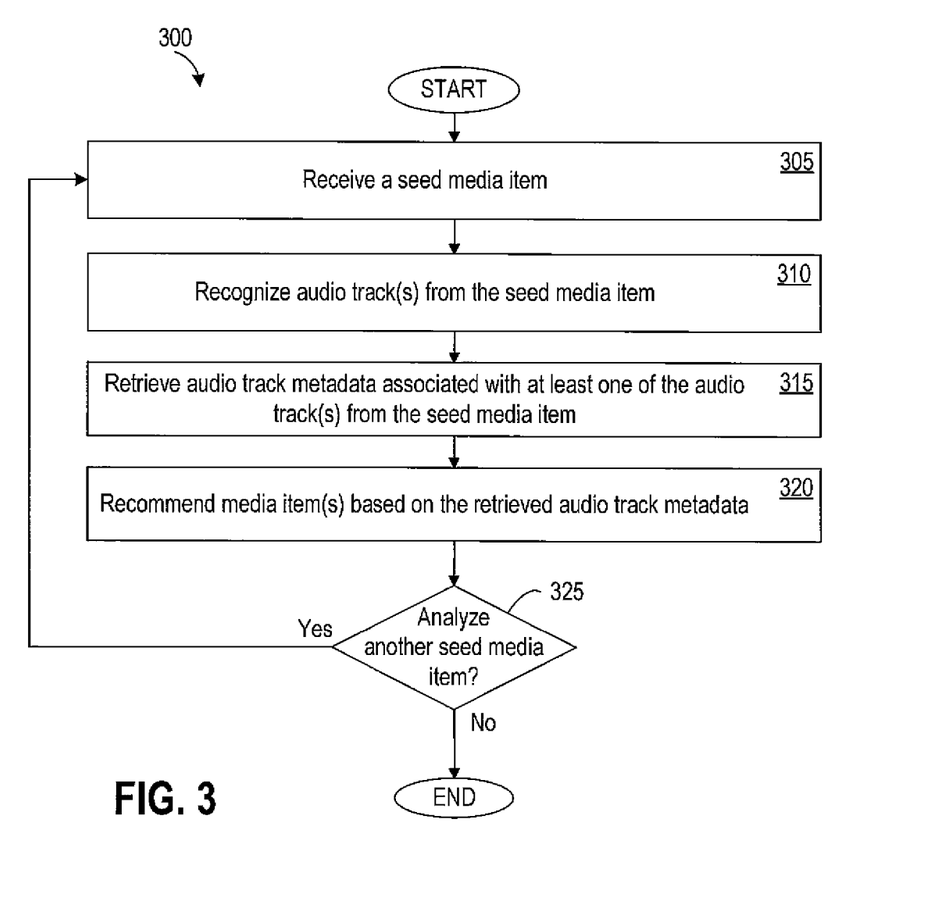
FIG. 3 is a flowchart of a method for generating media item recommendations by using metadata associated with audio tracks from a seed media item, in accordance with some embodiments.

FIG. 3 is a flowchart of a method 300 for generating media item recommendations by using metadata associated with audio tracks from a seed media item, in accordance with some embodiments. In some implementations, the steps of the method 300 may be carried out by the recommender system 210 of FIG. 2. In an implementation, the method 300 of FIG. 3 operates offline and not during a real-time communication with a user device over the Internet. In an alternative implementation, the method 300 operates during a real-time communication with a user device over the Internet.

The method 300 starts in a step 305 where the system receives a seed media item (e.g., movie and/or television program, etc.). The method 300 then moves to a step 310 where the system recognizes one or more audio tracks (e.g., songs, etc.) from the seed media item. Next, in a step 315, the system retrieves audio track metadata associated with at least one of the audio tracks from the seed media item. The method 300 then proceeds to a step 320 where the system recommends one or more media items based on the retrieved audio track metadata.

Next, in a decision operation 325, the system determines if another seed media item is to be analyzed. If another seed media item is to be analyzed, then the method 300 returns to the step 305 where the system receives another seed media item. However, if another seed media item is not to be analyzed, then the method 300 concludes after the decision operation 325.

Note that this method 300 may include other details and steps that are not discussed in this method overview. Other details and steps are discussed above with reference to the appropriate figures and may be a part of the method 300, depending on the embodiment.

III. Recommending a Media Item by Using Recommended Audio Tracks

A system is provided for recommending one or more media items (e.g., movies and/or television programs, etc.) based on recommended audio tracks (e.g., songs, etc.). As described above, a seed media item is a media item that the system has identified as being of interest to a user. The system automatically generates recommended audio tracks by analyzing metadata associated with audio tracks from the seed media item. The system may then generate recommended media items based on the recommended audio tracks.

Figure 4:
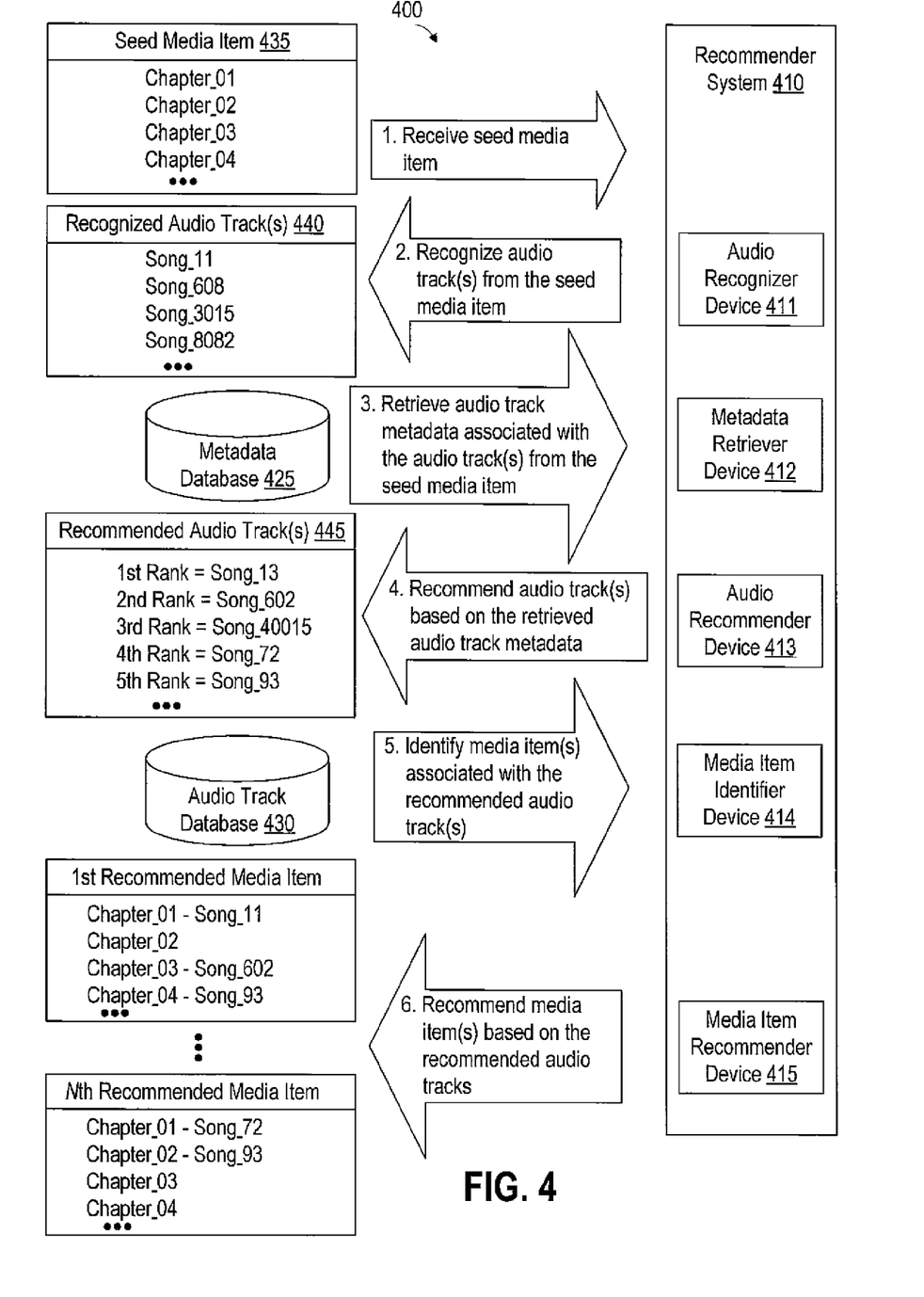
FIG. 4 is a schematic diagram of a system for generating media item recommendations by using recommended audio tracks, in accordance with some embodiments.

FIG. 4 is a schematic diagram of a system 400 for generating media item recommendations by using recommended audio tracks, in accordance with some embodiments. The parts of the system 400 are configured in a substantially similar manner as the parts of the system 200 of FIG. 2.

Like the system 200 of FIG. 2, the system 400 of FIG. 4 is configured for receiving the seed media item 435. As described above, a seed media item is a media item that the system has identified as being of interest to a user, preferably, by way of a user device indicating the media item is of interest. The seed media item 435 contains Chapter_01, Chapter_02, Chapter_03, Chapter_04 and so on. An audio recognizer device 411 is configured for recognizing one or more audio tracks 440 from the seed media item 435. A metadata database 425 is configured for storing, among other things, metadata that are associated with the recognized audio tracks 440. A metadata retriever device 412 is configured for retrieving metadata associated with the recognized audio track(s) 440 from the seed media item 435.

The following configuration of the system 400, described below, is preferably different than the configuration of the system 200 of FIG. 2. The audio recommender device 413 of FIG. 4 is configured for recommending one or more audio tracks 445. The recommending is preferably based on the retrieved audio track metadata associated with the one or more recognized audio tracks 440. Recommending an audio track preferably involves comparing the retrieved audio track metadata to metadata associated with potential audio tracks for recommendation. The audio recommender device 413 preferably performs the comparisons by using metadata that is previously stored in the metadata database 425. Note that the metadata database 425 is configured for storing the substantially similar type of data as the metadata database 225 of FIG. 2.

The audio recommender device 413 is configured for matching metadata that are sufficiently similar to the retrieved audio track metadata. The audio recommender device 413 searches the metadata database 425 for other audio track identifiers that may be associated with metadata that are sufficiently similar to the retrieved audio track metadata. The retrieved audio track metadata preferably include prominent metadata that are to be compared to metadata associated with other audio tracks other than the recognized audio tracks 440.

For example, the retrieved audio track metadata may include information related to genre, theme, instruments, mood and/or era, etc. Likewise, other metadata in the metadata database 425 may include, for example, information related to genre, theme, instruments, mood and/or era, etc. As a more specific example, the retrieved audio track metadata may include a significant amount of metadata indicating a genre of "rock", a theme of "driving music", instruments of "Brazilian percussion", a mood of "high intensity", and an era of "1970's". Other metadata in the metadata database 425 may also be at least somewhat related to this retrieved audio track metadata. The audio recommender device 413 searches this other metadata and compares this other metadata to the retrieved audio track metadata associated with the recognized audio tracks 440. The audio recommender device 413 provides one or more recommended audio tracks 445 that are at least somewhat related to the retrieved audio track metadata, and preferably substantially related to the retrieved audio track metadata.

The recommended audio tracks 445 are preferably different than the recognized audio tracks 440, as the recommended audio tracks 445 are preferably new audio tracks that are not from the seed media item 435, while the recognized audio tracks 440 are from the seed media item 435.

The recommended audio tracks 445 are preferably ranked according to metadata relevance to the retrieved audio track metadata. In the example of FIG. 4, the recommended audio tracks 445 include Song_13, Song_602, Song_40015, Song_72, Song_93 and so on. For instance, Song_13 is ranked 1st in audio track metadata relevance to the retrieved audio track metadata associated with the recognized audio tracks 440. Song_602 is ranked 2nd in audio track metadata relevance. Song_40015 is ranked 3rd in audio track metadata relevance. Song_72 is ranked 4th in audio track metadata relevance. Song_93 is ranked 5th in audio track metadata relevance.

The audio track database 430 is configured for storing audio track identifiers for audio tracks that are, at least in part, contained within a media item (e.g., movie and/or television program, etc.). For example, the movie "Forrest Gump" may include without limitation the song "Respect" performed by Aretha Franklin. The audio track database 430 may include an audio track identifier for the song "Respect" and may link that audio track identifier to the movie "Forrest Gump". As another example, the movie "Forrest Gump" may include without limitation the song "Hound Dog" performed by Elvis Presley. The audio track database 430 may include an audio track identifier for the song "Hound Dog" and may link that audio track identifier to the movie "Forrest Gump". The audio track database 430 may store many other audio track identifiers to provide a comprehensive collection of audio track identifiers that are linked to media items.

The media item identifier device 414 is configured for searching the audio track database 430 and identifying at least one media item (e.g., identified media item) that contains at least one recognized audio track 440 and/or at least one recommended audio track 445. For example, the media item identifier device 414 may identify the movie "Forrest Gump" because (1) that movie contains the song "Hound Dog" and (2) the song "Hound Dog" happens to be one of the recognized audio tracks 440 from the seed media item 435. The comparison performed by the media item identifier device 414 is preferably a one-to-one comparison. A particular media item contains either at least one recognized audio track 440 or zero recognized audio tracks 440. If the particular media item contains at least one recognized audio track 440, then the media identifier device 414 may identify that media item as being associated with the recognized audio track(s) 440.

As another example, the media item identifier device 414 may identify the movie "Forrest Gump" because (1) that movie contains the song "Respect" and (2) the song "Respect" happens to be one of the recommended audio tracks 445. The comparison performed by the media item identifier device 414 is preferably a one-to-one comparison. A particular media item contains either at least one recommended audio track 445 or zero recommended audio tracks 445. If the particular media item contains at least one recommended audio track 445, then the media item identifier device 414 may identify that media item as being associated with the recommended audio track(s) 445.

The media item recommender device 415 is configured for recommending one or more media items. Each recommended media item preferably contains at least one recommended audio track 445 and/or at least one recognized audio track 440. As described above, the recognized audio tracks 440 are contained within the seed media item 435 such as the movie or television show. The recommended audio tracks 445 are other audio tracks that are associated with audio track metadata that are sufficiently similar to the audio track metadata for the recognized audio tracks 440.

The media item recommender device 415 preferably ranks the one or more recommended media items according to levels of relevance to the recognized audio tracks 440 and/or the recommended audio tracks 445. The ranking preferably spans from 1st to Nth, where N is a positive integer. For example, the 1st recommended media item is preferably ranked 1st for relevance to the recognized audio tracks 440 and/or the recommended audio tracks 445. The Nth recommended media item is preferably ranked Nth for relevance to the recognized audio tracks 440 and/or the recommended audio tracks 445.

The media item recommender device 415 is also configured for ranking the recommended media items based on the number of higher ranked recommended audio tracks within each recommended media item. As described above, the recommended audio track(s) 445 may be ranked according to relevance to the retrieved audio track metadata. Accordingly, the media item recommender device 415 may rank higher a recommended media item for containing relatively more recommended audio tracks 445 that are highly ranked. Conversely, the media item recommender device 415 may rank lower a recommended media item for containing relatively fewer recommended audio tracks 445 that are highly ranked.

In the example of FIG. 4, the 1st recommended media item includes a Chapter_01, a Chapter_02, a Chapter_03, a Chapter_04 and so on. The 1st recommended media item includes the following songs within the chapters: Song_11, Song_602 and Song_93. Note that Song_11 is a recognized audio track 440. Song_602 and Song_93 are recommended audio tracks 445. The Nth recommended media item includes the following songs within the chapters: Song_72 and Song_93. Note that Song_72 and Song_93 are recommended audio tracks 445.

Further, in the example of FIG. 4, the 1st recommended media item may be ranked higher than the Nth recommended media item for at least two reasons. A first reason is that the 1st recommended media item contains a higher number of recognized audio tracks 440. For instance, the 1st recommended media item contains one recognized audio track 440, which is Song_11. Meanwhile, the Nth recommended media item contains zero recognized audio tracks 440. A second reason is that the 1st recommended media item contains more recommended audio tracks 445 that are highly ranked. For instance, Song_602 is illustrated in FIG. 4 as associated within the 1st recommended media item, and is ranked higher as a recommended audio track 445 than is Song_72, which is illustrated in this figure as associated within the Nth recommended media item. Note that both the 1st recommended media item and the Nth recommended media item contain Song_93. Accordingly, Song_93 preferably does not affect ranking between these two particular recommended media items.

The system 400 is configured for sending to a user device the one or more recommended media items. The user device is configured for displaying the one or more recommended media items, or is configured for displaying information that identifies the one or more recommended media items.

Figure 5:
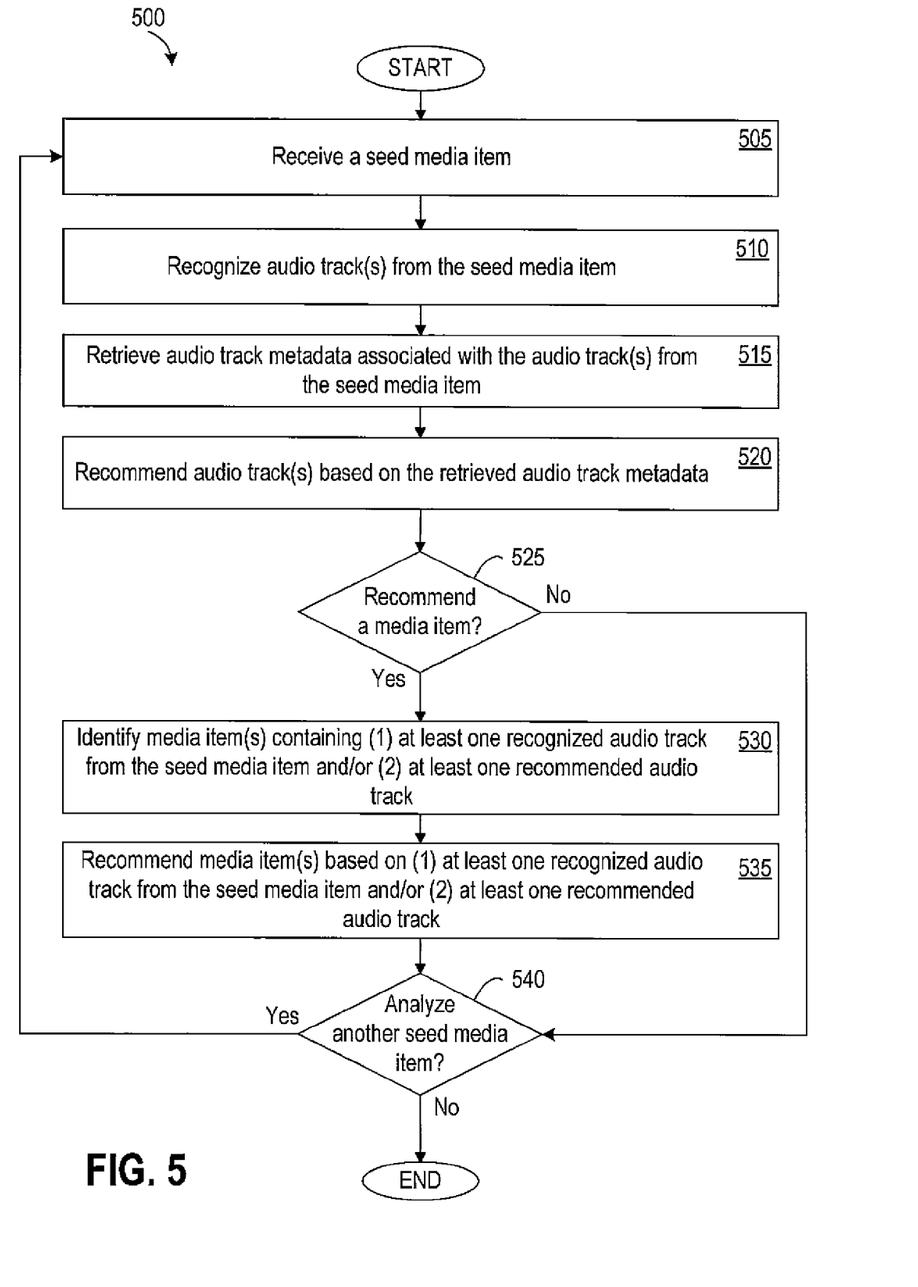
FIG. 5 is a flowchart of a method for generating media item recommendations by using recommended audio tracks, in accordance with some embodiments.

Overview of a Method for Recommending a Media item by Using Recommended Audio Tracks FIG. 5 is a flowchart of a method 500 for generating media item recommendations by using recommended audio tracks, in accordance with some embodiments. In some implementations, the steps of the method 500 may be carried out by the recommender system 410 of FIG. 4. In an implementation, the method 500 of FIG. 5 operates offline and not during a real time communication with a user device over the Internet. In an alternative implementation, the method 500 operates during a real-time communication with a user device over the Internet.

The method 500 starts in a step 505 where the system receives a seed media item (e.g., movie and/or television program, etc.). The method 500 then moves to a step 510 where the system recognizes one or more audio tracks (e.g., songs, etc.) from the seed media item. Next, in a step 515, the system retrieves audio track metadata associated with the one or more audio tracks from the seed media item. The method 500 then proceeds to a step 320 where the system recommends one or more audio tracks based on the retrieved audio track metadata.

Next, in a decision operation 525, the system determines if a media item is to be recommended. If a media item is not to be recommended, then the method 500 proceeds ahead to a decision operation 540, which is discussed below. However, if a media item is to be recommended, then the method 500 proceeds to a step 530 where the system identifies one or more media items that are each associated with (1) at least one recognized audio track from the seed media item and/or (2) at least one recommended audio track. The method 500 then moves to a step 535 where the system recommends one or more media items based on (1) at least one recognized audio track from the seed media item and/or (2) at least one recommended audio track.

Next, in the decision operation 540, the system determines if another seed media item is to be analyzed. If another seed media item is to be analyzed, then the method 500 returns to the step 505 where the system receives another seed media item. However, if another seed media item is not to be analyzed, then the method 500 concludes after the decision operation 540.

Note that this method 500 may include other details and steps that are not discussed in this method overview. Other details and steps are discussed above with reference to the appropriate figures and may be a part of the method 500, depending on the embodiment.

IV. Computer Readable Medium Implementation

Figure 6:
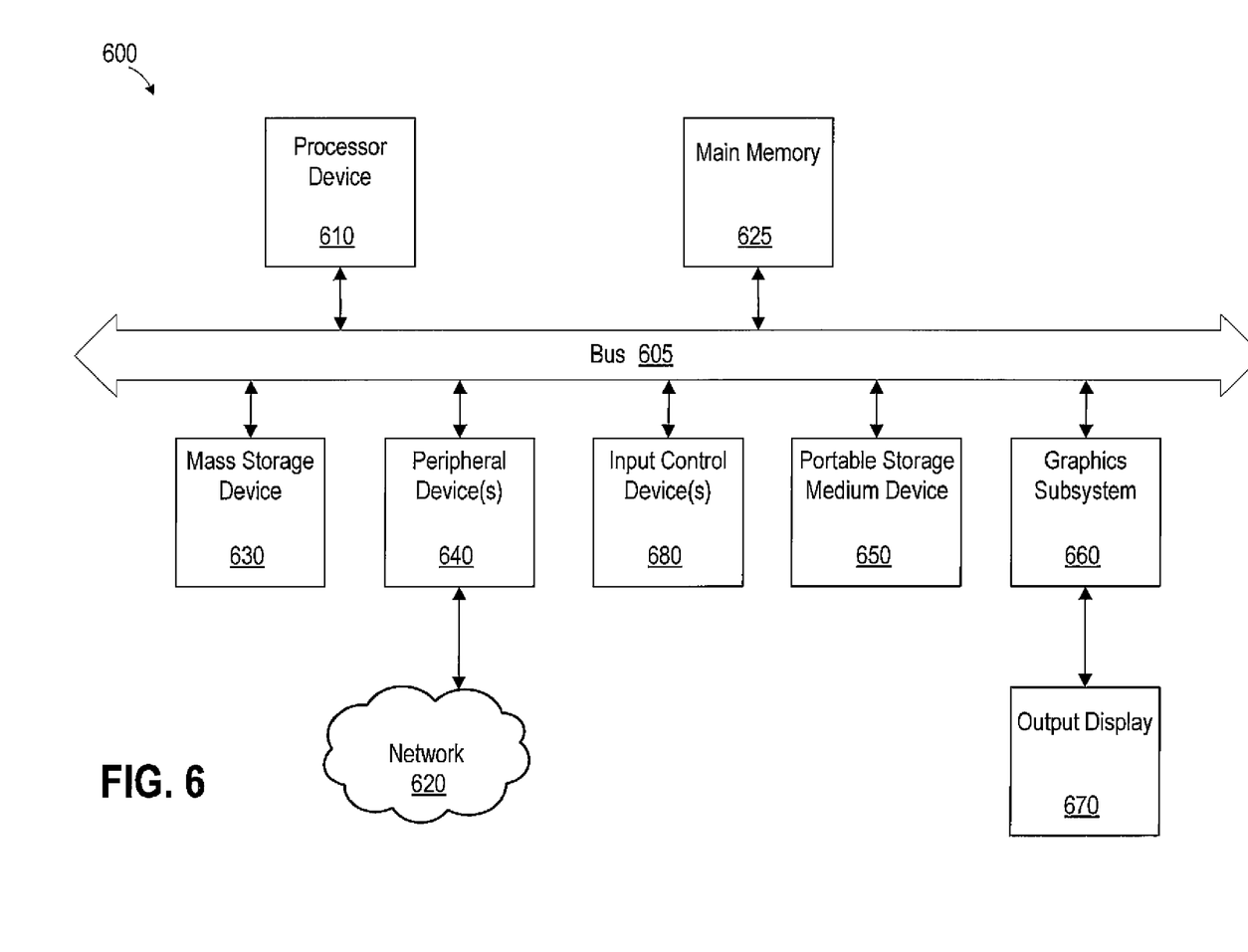
FIG. 6 is a block diagram of a general and/or special purpose computer system, in accordance with some embodiments.

FIG. 6 is a block diagram of a general and/or special purpose computer system 600, in accordance with some embodiments. The computer system 600 may be, for example, a user device, a user computer, a client computer and/or a server computer, among other things. Examples of a user device include without limitation a Blu-ray Disc player, a personal media device, a portable media player, an iPod™, a Zune™ Player, a laptop computer, a palmtop computer, a smart phone, a cell phone, a mobile phone, an mp3 player, a digital audio recorder, a digital video recorder, a CD player, a DVD player, an IBM-type personal computer (PC) having an operating system such as Microsoft Windows™, an Apple™ computer having an operating system such as MAC-OS, hardware having a JAVA-OS operating system, and a Sun Microsystems Workstation having a UNIX operating system.

The computer system 600 preferably includes without limitation a processor device 610, a main memory 625, and an interconnect bus 605. The processor device 610 may include without limitation a single microprocessor, or may include without limitation a plurality of microprocessors for configuring the computer system 600 as a multi-processor system. The main memory 625 stores, among other things, instructions and/or data for execution by the processor device 610. If the system for generating a synthetic table of contents is partially implemented in software, the main memory 625 stores the executable code when in operation. The main memory 625 may include banks of dynamic random access memory (DRAM), as well as cache memory.

The computer system 600 may further include a mass storage device 630, peripheral device(s) 640, portable storage medium device(s) 650, input control device(s) 680, a graphics subsystem 660, and/or an output display 670. For explanatory purposes, all components in the computer system 600 are shown in FIG. 6 as being coupled via the bus 605. However, the computer system 600 is not so limited. Devices of the computer system 600 may be coupled through one or more data transport means. For example, the processor device 610 and/or the main memory 625 may be coupled via a local microprocessor bus. The mass storage device 630, peripheral device(s) 640, portable storage medium device(s) 650, and/or graphics subsystem 660 may be coupled via one or more input/output (I/O) buses. The mass storage device 640 is preferably a nonvolatile storage device for storing data and/or instructions for use by the processor device 610. The mass storage device 630, which may be implemented, for example, with a magnetic disk drive or an optical disk drive. In a software embodiment, the mass storage device 630 is preferably configured for loading contents of the mass storage device 630 into the main memory 625.

The portable storage medium device 650 operates in conjunction with a nonvolatile portable storage medium, such as, for example, a compact disc read only memory (CD ROM), to input and output data and code to and from the computer system 600. In some embodiments, the software for generating a synthetic table of contents may be stored on a portable storage medium, and may be inputted into the computer system 600 via the portable storage medium device 650. The peripheral device(s) 640 may include any type of computer support device, such as, for example, an input/output (I/O) interface configured to add additional functionality to the computer system 600. For example, the peripheral device(s) 640 may include a network interface card for interfacing the computer system 600 with a network 620.

The input control device(s) 680 provide a portion of the user interface for a user of the computer system 600. The input control device(s) 680 may include a keypad and/or a cursor control device. The keypad may be configured for inputting alphanumeric and/or other key information. The cursor control device may include, for example, a mouse, a trackball, a stylus, and/or cursor direction keys. In order to display textual and graphical information, the computer system 600 preferably includes the graphics subsystem 660 and the output display 670. The output display 670 may include a cathode ray tube (CRT) display and/or a liquid crystal display (LCD). The graphics subsystem 660 receives textual and graphical information, and processes the information for output to the output display 670.

Each component of the computer system 600 may represent a broad category of a computer component of a general and/or special purpose computer. Components of the computer system 600 are not limited to the specific implementations provided here.

Portions of the invention may be conveniently implemented by using a conventional general purpose computer, a specialized digital computer and/or a microprocessor programmed according to the teachings of the present disclosure, as will be apparent to those skilled in the computer art. Appropriate software coding may readily be prepared by skilled programmers based on the teachings of the present disclosure. Some embodiments may also be implemented by the preparation of application-specific integrated circuits or by interconnecting an appropriate network of conventional component circuits.

Some embodiments include a computer program product. The computer program product may be a storage medium and/or media having instructions stored thereon and/or therein which can be used to control, or cause, a computer to perform any of the processes of the invention. The storage medium may include without limitation floppy disk, mini disk, optical disc, Blu-ray Disc, DVD, CD-ROM, microdrive, magneto-optical disk, ROM, RAM, EPROM, EEPROM, DRAM, VRAM, flash memory, flash card, magnetic card, optical card, nanosystems, molecular memory integrated circuit, RAID, remote data storage/archive/warehousing, and/or any other type of device suitable for storing instructions and/or data.

Stored on any one of the computer readable medium and/or media, some implementations include software for controlling both the hardware of the general and/or special computer or microprocessor, and for enabling the computer and/or microprocessor to interact with a human user and/or another mechanism utilizing the results of the invention. Such software may include without limitation device drivers, operating systems, and user applications. Ultimately, such computer readable media further includes software for performing aspects of the invention, as described above.

Included in the programming and/or software of the general and/or special purpose computer or microprocessor are software modules for implementing the processes described above. The processes described above may include without limitation the following: receiving a seed media item, recognizing one or more recognized audio tracks from the seed media item, retrieving audio track metadata associated with at least one of the recognized audio tracks from the seed media item, and recommending one or more recommended media items based on the audio track metadata.

Advantages

The system provides a platform for recommending a media item by using audio content (e.g., audio tracks and/or songs) from a seed media item (e.g., movie and/or television program). The system needs little, or no, user profile information to provide recommended media items. The system is preferably configured for using large databases of audio track metadata (e.g., music metadata) in order to provide enhanced media item recommendations (e.g., movie recommendations) and to provide other sources for generating media metadata. The system addresses the problem of generating content based recommendations for movies and/or television programs. For example, unfortunately, movie metadata classifications (e.g., genre, theme, instruments, mood, etc.) are usually relatively shallow and overly broad to provide meaningful movie recommendations. Fortunately, those same classifications within music metadata are deep and cover about an order of magnitude more songs than movies. The high volume of songs and associated metadata allows the system to utilize the songs and associated metadata for providing enhanced media item recommendations.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for recommending a media item, wherein the method is configured for being carried out by at least one computer, the method comprising:
   receiving a seed media item that is an audio-visual recording identified as being of interest to a user, the seed media item containing audio content and video content;
   recognizing one or more audio tracks from the audio content contained in the seed media item;
   retrieving audio track metadata associated with at least one of the audio tracks recognized from the audio content contained in the seed media item, wherein the retrieved audio track metadata describes an audio recording; and
   recommending one or more media items that are audio-visual recordings, based on the retrieved audio track metadata,
   wherein each recommended media item is an audio-visual recording that is different than the seed media item.

2. The method of claim 1, wherein recognizing one or more audio tracks comprises at least one of:
   using a rolling recognition technique;
   automatically identifying songs from audio content of the seed media item; and
   storing one or more audio track identifiers into a metadata database, wherein each audio track identifier is associated with metadata that is associated with an audio track.

3. The method of claim 1, wherein the audio track metadata are originally obtained from one or more metadata sources, wherein a metadata source is at least one of:
   a user device;
   an administrator device; and
   a robotic device.

4. The method of claim 1, wherein the audio track metadata comprises one or more prominent metadata elements, wherein a prominent metadata element includes at least one of:
   genre;
   theme;
   instruments;
   mood; and
   era.

5. The method of claim 1, wherein a strength of a recommendation of a recommended media item is based on media metadata relevance to at least one of:
   the audio track metadata; and
   seed media item metadata, wherein the seed media item metadata are metadata that are directly associated with the seed media item.

6. The method of claim 5, wherein recommending one or more media items comprises ranking the recommended media items according to levels of media metadata relevance to the retrieved audio track metadata.

7. The method of claim 1, wherein a media item is at least one of:
   a movie; and
   a television program.

8. A system for recommending a media item, wherein the system is configured for performing steps comprising:
   receiving a seed media item that is an audio-visual recording identified as being of interest to a user, the seed media item containing audio content and video content;
   recognizing one or more audio tracks from the audio content contained in the seed media item;
   retrieving audio track metadata associated with at least one of the audio tracks recognized from the audio content contained in the seed media item, wherein the retrieved audio track metadata describes an audio recording; and
   recommending one or more media items that are audio-visual recordings, based on the retrieved audio track metadata,
   wherein each recommended media item is an audio-visual recording that is different than the seed media item.

9. The system of claim 8, wherein recognizing one or more audio tracks comprises at least one of:
   using a rolling recognition technique;
   automatically identifying songs from audio content of the seed media item; and
   storing one or more audio track identifiers into a metadata database, wherein each audio track identifier is associated with metadata that is associated with an audio track.

10. The system of claim 8, wherein the audio track metadata are originally obtained from one or more metadata sources, wherein a metadata source is at least one of:
   a user device;
   an administrator device; and
   a robotic device.

11. The system of claim 8, wherein the audio track metadata comprises one or more prominent metadata elements, wherein a prominent metadata element includes at least one of:
   genre;
   theme;
   instruments;
   mood; and
   era.

12. The system of claim 8, wherein a strength of a recommendation of a recommended media item is based on media metadata relevance to at least one of:
   the audio track metadata; and
   seed media item metadata, wherein the seed media item metadata are metadata that are directly associated with the seed media item.

13. The system of claim 12, wherein recommending one or more media items comprises ranking the recommended media items according to levels of media metadata relevance to the retrieved audio track metadata.

14. The system of claim 8, wherein a media item is at least one of:
   a movie; and
   a television program.

15. A computer readable medium comprising one or more instructions for recommending a media item, wherein the one or more instructions are configured for causing one or more processors to perform the steps of:
   receiving a seed media item that is an audio-visual recording identified as being of interest to a user, the seed media item containing audio content and video content;
   recognizing one or more audio tracks from the audio content contained in the seed media item;
   retrieving audio track metadata associated with at least one of the audio tracks recognized from the audio content contained in the seed media item, wherein the retrieved audio track metadata describes an audio recording; and
   recommending one or more media items that are audio-visual recordings, based on the retrieved audio track metadata,
   wherein each recommended media item is an audio-visual recording that is different than the seed media item.

16. A method for recommending a media item, wherein the method is configured for being carried out by at least one computer, the method comprising:
   receiving a seed media item that is an audio-visual recording identified as being of interest to a user, the seed media item containing audio content and video content;
   recognizing one or more audio tracks from the audio content contained in the seed media item;
   retrieving audio track metadata associated with at least one of the audio tracks recognized from the audio content contained in the seed media item, wherein the retrieved audio track metadata describes an audio recording; and
   recommending one or more audio tracks based on the retrieved audio track metadata, wherein the recommending is based on the audio track metadata associated with at least one of the audio tracks recognized from the audio content contained in the seed media item.

17. The method of claim 16, further comprising identifying one or more media items, wherein each identified media item contains at least one of:
   one or more audio tracks recognized from the audio content contained in the seed media item; and
   one or more recommended audio tracks.

18. The method of claim 16, further comprising recommending one or more media items, wherein each recommended media item contains at least one of:
   one or more audio tracks recognized from the audio content contained in the seed media item; and
   one or more recommended audio tracks.

19. The method of claim 18, wherein recommending one or more media items comprises ranking the one or more recommended media items according to levels of relevance to at least one of:
   one or more audio tracks recognized from the audio content contained in the seed media item; and
   one or more recommended audio tracks.

20. The method of claim 18, wherein recommending one or more media items comprises at least one of:
   ranking one or more recommended media items according to a number of higher ranked recommended audio tracks within each recommended media item;
   ranking a recommended media item higher for containing relatively more recommended audio tracks that are higher ranked; and
   ranking a recommended media item lower for containing relatively fewer recommended audio tracks that are higher ranked.

21. The method of claim 16, wherein recommending one or more audio tracks comprises ranking the recommended audio tracks according to relevance to the audio track metadata associated with at least one of the audio tracks recognized from the audio content contained in the seed media item.

22. A system for recommending a media item, wherein the system is configured for performing steps comprising:
   receiving a seed media item that is an audio-visual recording identified as being of interest to a user, the seed media item containing audio content and video content;
   recognizing one or more audio tracks from the audio content contained in the seed media item;
   retrieving audio track metadata associated with at least one of the audio tracks recognized from the audio content contained in the seed media item, wherein the retrieved audio track metadata describes an audio recording; and
   recommending one or more audio tracks based on the retrieved audio track metadata, wherein the recommending is based on the audio track metadata associated with at least one of the audio tracks recognized from the audio content contained in the seed media item.

23. The system of claim 22, the steps further comprising identifying one or more media items, wherein each identified media item contains at least one of:
   one or more audio tracks recognized from the audio content contained in the seed media item; and
   one or more recommended audio tracks.

24. The system of claim 22, the steps further comprising recommending one or more media items, wherein each recommended media item contains at least one of:
   one or more audio tracks recognized from the audio content contained in the seed media item; and
   one or more recommended audio tracks.

25. The system of claim 24, wherein recommending one or more media items comprises ranking the one or more recommended media items according to levels of relevance to at least one of:
   one or more audio tracks recognized from the audio content contained in the seed media item; and
   one or more recommended audio tracks.

26. The system of claim 24, wherein recommending one or more media items comprises at least one of:

ranking one or more recommended media items according to a number of higher ranked recommended audio tracks within each recommended media item;
ranking higher a recommended media item for containing relatively more recommended audio tracks that are highly ranked; and
ranking lower a recommended media item for containing relatively fewer recommended audio tracks that are highly ranked.

27. The system of claim 22, wherein recommending one or more audio tracks further comprises ranking the recommended audio tracks according to relevance to the audio track metadata associated with at least one of the audio tracks recognized from the audio content contained in the seed media item.

28. A computer readable medium comprising one or more instructions for recommending a media item, wherein the one or more instructions are configured for causing one or more processors to perform the steps of:
receiving a seed media item that is an audio-visual recording identified as being of interest to a user, the seed media item containing audio content and video content;
recognizing one or more audio tracks from the audio content contained in the seed media item;
retrieving audio track metadata associated with at least one of the audio tracks recognized from the audio content contained in the seed media item, wherein the retrieved audio track metadata describes an audio recording; and
recommending one or more audio tracks based on the audio track metadata, wherein the recommending is based on the audio track metadata associated with at least one of the audio tracks recognized from the audio content contained in the seed media item.

\* \* \* \* \*